United States Patent [19]

Wong

[11] Patent Number: 5,003,664
[45] Date of Patent: Apr. 2, 1991

[54] AUTOMOBILE MAT AND SECURING CLIP

[76] Inventor: Dorothy Y. Wong, 22W725 Elmwood Dr., Glen Ellyn, Ill. 60137

[21] Appl. No.: 236,795

[22] Filed: Aug. 26, 1988

[51] Int. Cl.$^5$ .................... A47G 27/04; B32B 3/06; B32B 7/08

[52] U.S. Cl. ................................ 16/6; 16/8; 24/350; 24/380; 428/53; 428/61; 428/62; 428/86; 428/95; 428/100; 428/223

[58] Field of Search ............ 428/53, 61, 62, 86, 428/95, 99, 100, 223; 16/6, 8

[56] References Cited

U.S. PATENT DOCUMENTS

| | | | |
|---|---|---|---|
| 363,399 | 5/1887 | Kilmer . | |
| 581,634 | 4/1889 | Veal | 16/6 |
| 778,287 | 12/1904 | Van Buren | 16/8 |
| 2,643,963 | 6/1953 | Jaasund | 428/100 |
| 2,976,914 | 3/1961 | Miller | 155/170 |
| 3,405,408 | 10/1968 | Baker | 2/145 |
| 3,817,015 | 6/1974 | Frangos | 52/511 |
| 4,012,544 | 3/1977 | Richards | 428/95 |
| 4,340,633 | 7/1982 | Robbins | 428/100 |
| 4,481,240 | 11/1984 | Roth | 428/95 |
| 4,588,628 | 5/1986 | Roth | 428/85 |
| 4,671,981 | 6/1987 | McLaughlin | 428/95 |
| 4,692,364 | 9/1987 | Altus | 428/85 |
| 4,716,065 | 12/1987 | McLaughlin | 428/95 |
| 4,860,402 | 8/1989 | Dichtel | 16/6 |

Primary Examiner—James C. Cannon
Attorney, Agent, or Firm—Marshall, O'Toole, Gerstein, Murray & Bicknell

[57] ABSTRACT

A clip is disclosed for securing a mat to a carpet wherein the clip has a main portion joined to a spike. The spike is inserted into and underlies the carpet such that the main portion is exposed. One-half of a loop and hook type fastener is secured to the exposed side of the main portion of the clip and the corresponding second half of the fastener is secured to the second surface of the mat to permit the mat to be secured to the main portion of the clip.

17 Claims, 1 Drawing Sheet

AUTOMOBILE MAT AND SECURING CLIP

TECHNICAL FIELD

The present invention relates to an automobile mat, and more particularly, to a clip that secures an automobile mat to an underlying carpet.

BACKGROUND ART

It is often desirable to place a mat atop a carpet in order to keep the carpet clean and to reduce its wear and tear. Generally, the mat lies freely atop the carpet and, upon the exertion of an exterior force, it is moved away from its initial location, and as a result, the carpet becomes dirty and worn. One method to secure a mat atop a carpet is to sew or otherwise secure one-half of a hook and loop type fastener directly to the carpet and to secure the corresponding other half of the fastener directly to the underside of the mat. See, for example, Richards U.S. Pat. No. 4,012,544 and McLaughlin U.S. Pat. No. 4,671,981. There are problems with this, however. Once the fastener on the carpet wears, it has to be removed and this is not only difficult, but it can also cause damage to the carpet.

Secondly, periodic cleaning of the carpet can wear the fastener and thus hinder its performance.

Additionally, once the fastener is secured to the carpet, the car operator is forced to use mats having a specific size and configuration to correspond to the location of the fasteners.

Patent disclosing the use of metal clips or pins which are inserted through the mat and carpet such that a head of the clip or pin remain above the surface of the mat include Kilmer U.S. Pat. No. 363,399 and VanBuren U.S. Pat. No. 778,287. These metal clips or pins, however, are unsightly since the head of the clip or pin is visible in use. Also, the clips must be completely removed and reinserted whenever the carpet is to be cleaned, thus causing damage to the carpet and mat in addition to inconveniencing the user.

The present invention is directed toward overcoming one or more of the problems as set forth above.

SUMMARY OF THE INVENTION

In one aspect of the present invention, a clip for securing a mat to a carpet is provided with a main portion and a spike extending from the main portion. The spike is inserted into the carpet such that it underlies the carpet with the main portion exposed atop the carpet. Means are provided to secure the mat to the main portion using a hook and loop type fastener.

It is an object of the present invention to secure a mat to a carpet and to permit simple removal of the mat from the carpet.

Still another object of the present invention is to provide a removable mat securing means than can easily be removed and placed at different locations.

It is yet another object of the present invention to provide a mat securing means which is not exposed while in use.

DESCRIPTION OF THE PREFERRED EMBODIMENT

Figure 1:
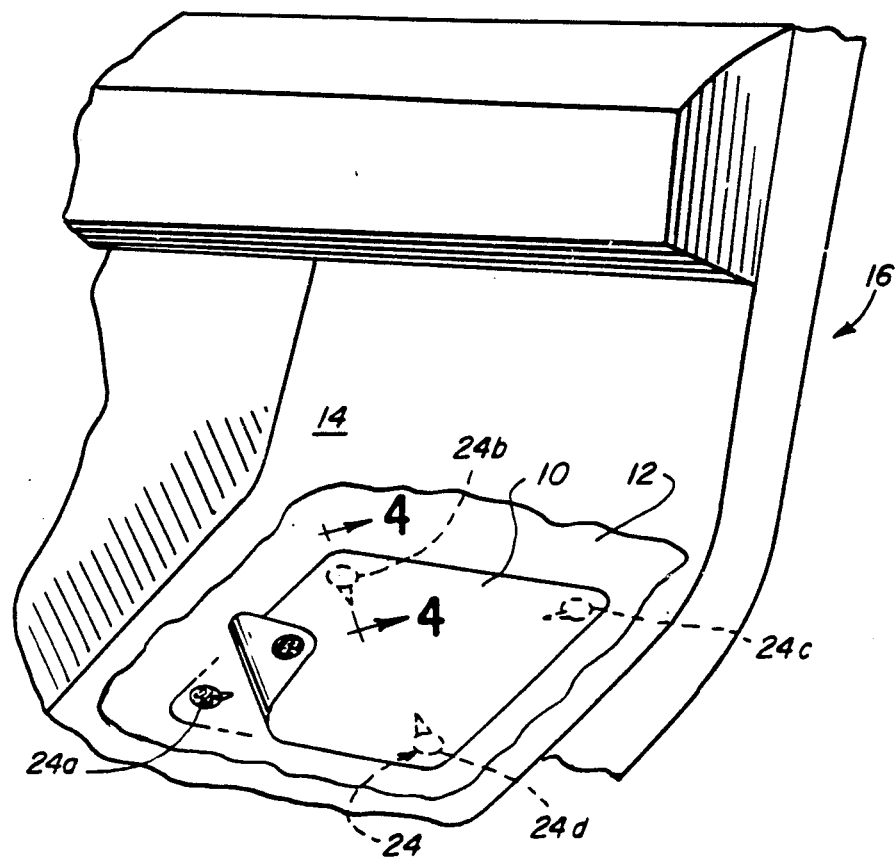
FIG. 1 is a perspective view illustrating the clip, mat and carpet disposed in a well area of a vehicle with one edge of the mat folded over showing the clip and fastener.
Figure 2:
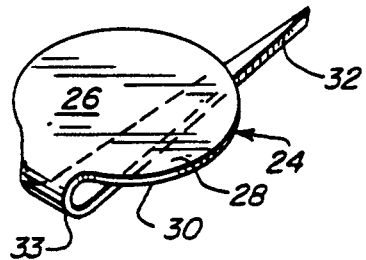
FIG. 2 is a perspective view of the clip.
Figure 3:
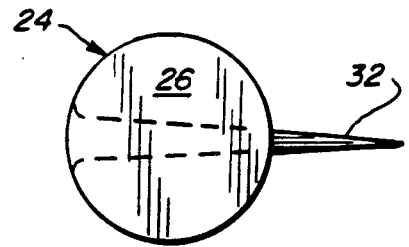
FIG. 3 is a plan view of the clip.
Figure 4:
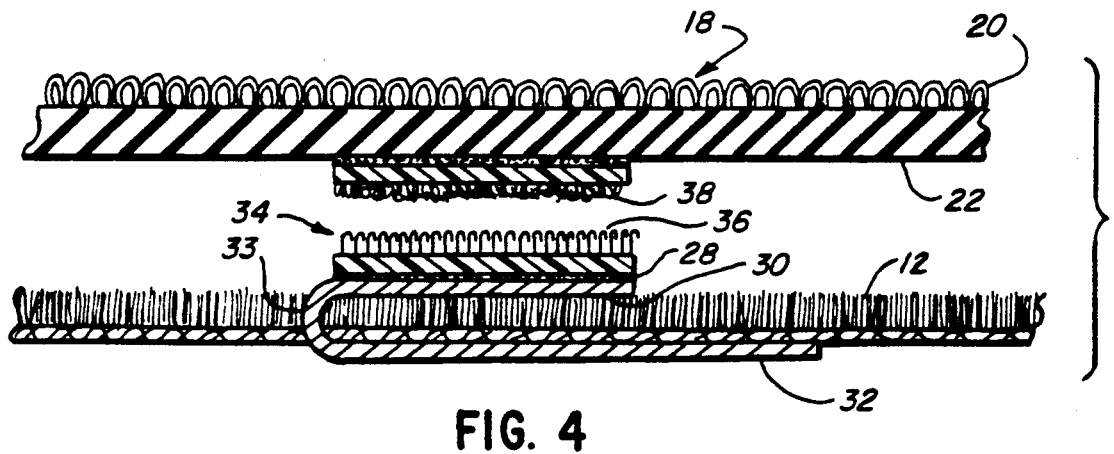
FIG. 4 is a sectional view taken along line 4—4 in FIG. 1 illustrating the spike inserted into the carpet.

An exemplary embodiment of a floor covering for a carpet in a well area of a vehicle is illustrated in the drawings. However, the invention is not limited to use in a vehicle and may have applicability in securing two or more pieces of material having opposite facing surfaces in many environments.

A floor covering or mat 10 for a carpet 12 in a well area 14 of an automobile 16 is shown in the figures and includes an upwardly facing first surface 20 and a downwardly facing second surface 22 wherein the downwardly facing surface 22 is in contact with the carpet 12. A clip 24 is provided at each corner of the mat 10, and are accordingly designated as 24a, 24b, 24c and 24d. Each clip is identical and unless otherwise noted only one clip 24 will be described. The clip 24 has a generally round main portion 26 with an upwardly facing first side 28 and a downwardly facing second side 30. It should be noted, however, that the invention does not limit the shape of the main portion. A horizontal spike 32 is joined to the main portion 26 by a throat 33 wherein the main portion 24, spike 32, and throat 33 may be constructed from a single integral metal, such as stainless steel stamping. The spike 32 is spaced below the downwardly facing side 30 of the main portion 26 and extends beyond the perimeter of the main portion 26.

In use, the spike 32 is inserted into and underlies the carpet 12. The upwardly facing side 28 of the main portion 26 is adjacent to or flush with the carpet 12 and the downwardly facing side 30 is substantially in contact with the carpet 12 such that the carpet 12 is disposed between the downwardly facing side 30 and the spike 32. A loop and hook type fastener 34 is provided to removably secure the downwardly facing surface 22 of the mat 10 to the upwardly facing side 28 of the main portion 26. More specifically, one-half of the fastener, for example, the hook portion 36, is secured to the upwardly facing side 28 of the main portion 26 and the corresponding loop portion 38 is secured to the downwardly facing surface 22 of the mat 10 by stitching on a suitable adhesive.

When the mat 10 is placed upon the carpet 12, the loop portion 38 on the downwardly facing surface 22 of the mat 10 contacts the hook portion 36 on the upwardly facing side 28 of the main portion 26 thereby securing the mat 10 to the clips 24.

As noted above, the clip 24 is preferably fabricated of stainless steel, although other types of materials might alternatively be used. Also, the throat 33 may be of such a thickness to allow it to be deformed slightly so that the main portion 26 and spike 32 pinch the carpet 12 to maintain the clip in position. Thus, a clip 24 of single size can be used with carpets of varied thicknesses.

In use, as discussed previously, each corner of the mat 10 is secured by a clip 24a-24d, respectively. See FIG. 1. If the mat 10 is forced toward a direction, the clip 24 opposite the horizontal and vertical components of the resulting force resist the force and thus prevent the mat 10 from shifting.

For example, if the mat 10 is forced directly to the right in FIG. 1, clips 26a and 26b are urged in the direction of the line of force of the mat 10 and the throat 33 of clips 26a and 26b contact the carpet 12 and thus prevent the mat 10 from shifting. If the mat 10 is forced upwardly in FIG. 1, clips 26a and 26d prevent the mat from shifting. Similarly, if mat 10 is forced upwardly and toward the right in FIG. 1, clips 26a, 26b and 26d collectively prevent the mat 10 from shifting.

It is readily apparent that the clips 24 provide an efficient, practical and inexpensive method of preventing the mat 10 from sliding atop the carpet 12. Also, the mat can be easily removed from the clips, laundered or otherwise cleaned and returned to its original position in the vehicle.

In addition to the foregoing, the clips can be easily removed from the carpet, if desired, without leaving noticeable marks therein. Thus, the clips can be transferred from vehicle to vehicle without damaging the carpeting of same.

Other aspects, objects and advantages of the invention can be obtained from a study of the drawings, the specification and the appended claims.

What is claimed is:

1. A floor covering for a carpet comprising:
   a mat having a first and second surface, said second surface in contact with said carpet;
   a clip having a main portion with first and second opposed sides and a spike joined to the main portion and spaced from the second side of the main portion,
   wherein the spike is inserted into the carpet such that it underlies the same with the main portion exposed and the second side of the main portion facing the carpet, said carpet disposed between the spike and main portion; and
   means for securing the second surface of the mat to the first side of the main portion of the clip.

2. The floor covering of claim 1, wherein the first surface of said mat faces upwardly and the second surface faces downwardly wherein the first side of the main portion of the clip faces upwardly toward the downwardly facing side of the mat and the second side faces downwardly toward said carpet.

3. The floor covering of claim 1, wherein the main portion is generally round and flush with the carpet.

4. The floor covering of claim 1, wherein the main portion and the spike is a single continuous piece with the spike extending beyond the perimeter of the main portion.

5. The floor covering of claim 1, wherein the securing means consist of a hook and loop type fastener wherein one-half of the fastener is secured to the second surface of the mat and one-half is secured to the first side of the main portion of said clip.

6. A floor covering for a carpet in a well area of a vehicle, comprising:
   a mat having a first and second surface disposed in the well area of the vehicle wherein the second surface is in contact with the carpet;
   a clip having a main portion with first and second opposed sides and a spike joined to the main portion and spaced from the second side of the main portion,
   wherein the spike is inserted into the carpet such that it underlies the same with the main portion exposed and the second side of the main portion facing the carpet wherein the carpet is disposed between the spike and main portion;
   means for securing the second surface of the mat to the first side of the main portion of said clip in the well area of the vehicle.

7. The floor covering of claim 6, wherein the first surface of said mat faces upwardly and the second surface faces downwardly, wherein the first side of the main portion of the clip faces upwardly toward the downwardly facing side of the mat and the second side faces downwardly toward said carpet.

8. The floor covering of claim 6, wherein the main portion is generally round and flush with the carpet.

9. The floor covering of claim 6, wherein the main portion and the spike is a single continuous piece with the spike extending beyond the perimeter of the main portion.

10. The floor covering of claim 6, wherein the securing means consists of a hook and loop type fastener wherein one-half of the fastener is secured to the second surface of the mat and one-half is secured to the first side of the main portion of said clip.

11. A floor covering for a carpet, comprising:
    a mat having a first and a second surface, said second surface in contact with said carpet;
    a clip having a generally round main portion with first and second opposed sides and spike joined to the main portion and spaced from the second side of the main portion wherein the spike is inserted into the carpet such that the spike underline the carpet with the main portion exposed and flush with the carpet and wherein the main portion and the spike is a single continuous piece with the spike extending beyond the perimeter of the main portion;
    wherein the first surface of the mat faces upwardly and second surface of the mat faces downwardly and the first side of the main portion of the clip faces upwardly toward the downwardly facing side of the mat and the second side of the main portion of the clip faces downwardly toward the carpet; and
    means for securing the second surface of the mat to the first side of the main portion of the clip wherein the securing means comprises a hook-and-loop type fastener where one-half of the fastener is secured to the second surface of the mat and another half of the fastener is secured to the first side of the main portion of the clip.

12. A clip, comprising:
    a main portion having first and second opposed sides;
    a spike joined to said main portion and spaced from the second side of the main portion wherein the spike is capable of insertion into a carpet such that the spike underlies the carpet with the main portion exposed and the second side of the main portion facing the carpet and such that the carpet is disposed between the spike and main portion; and
    means for allowing a mat to be secured to the first side of the main portion of the clip.

13. The clip of claim 12, wherein when the clip is used to secure a mat to a carpet the first surface of the mat faces upwardly and the second surface faces downwardly toward the carpet the first side of the main portion of the clip faces upwardly toward the downwardly facing side of the mat and the second side faces downwardly toward said carpet when the spike is inserted into the carpet and the mat is secured to the first side of the main portion of the clip.

14. The clip of claim 12, wherein the main portion is generally round and flush with the carpet when the spike is inserted therein.

15. The clip of claim 12, wherein the main portion and the spike is a single continuous piece with the spike extending beyond the perimeter of the main portion.

16. The clip of claim 12, wherein the securing means comprises a hook-and-loop type fastener wherein one half of the fastener is secured to a bottom surface of the mat and one half of the fastener is secured to the first side of the main portion of said clip.

17. A clip, comprising:
 a generally round main portion having first and second opposed sides;
 a spike joined to the main portion to form a single continuous piece wherein the spike extends beyond the perimeter of the main portion and is spaced from the second side of the main portion and wherein the spike may be inserted into a carpet such that the spike underlies same with the main portion facing the carpet such that the carpet is disposed between the spike and the main portion; and
 means for allowing a mat to be secured to the first side of the main portion of the clip wherein the mat includes a first surface which faces upwardly and a second surface which faces which faces downwardly and wherein the first side of the main portion of the clip faces upwardly toward the downwardly facing side of the mat and the second side of the clip faces downwardly toward the carpet, the securing means comprising a hook-and-loop type fastener where one-half of the fastener is secured to the second surface of the mat and another half of the fastener is secured to the first side of the main portion of the clip such that the second surface of the mat may be secured to the first side of the main portion of the clip.

* * * * *